United States Patent
Arseneault

(10) Patent No.: US 10,405,170 B2
(45) Date of Patent: Sep. 3, 2019

(54) METHOD AND SYSTEM FOR STORING CONTACT INFORMATION IN A NETWORK CONTACT DATABASE

(75) Inventor: Jonathan Allan Arseneault, Orleans (CA)

(73) Assignee: BCE INC., Verdun (CA)

( * ) Notice: Subject to any disclaimer, the term of this patent is extended or adjusted under 35 U.S.C. 154(b) by 595 days.

(21) Appl. No.: 12/665,909

(22) PCT Filed: Dec. 24, 2008

(86) PCT No.: PCT/CA2008/002295
§ 371 (c)(1),
(2), (4) Date: Dec. 21, 2009

(87) PCT Pub. No.: WO2010/071966
PCT Pub. Date: Jul. 1, 2010

(65) Prior Publication Data
US 2011/0078208 A1    Mar. 31, 2011

(51) Int. Cl.
*H04W 8/18* (2009.01)
*H04L 29/12* (2006.01)
*H04L 29/08* (2006.01)

(52) U.S. Cl.
CPC .......... *H04W 8/18* (2013.01); *H04L 61/1594* (2013.01); *H04L 67/306* (2013.01)

(58) Field of Classification Search
CPC ..................................................... H04W 8/18
USPC ......................................... 707/802; 715/760
See application file for complete search history.

(56) References Cited

U.S. PATENT DOCUMENTS

| | | | |
|---|---|---|---|
| 6,640,239 B1* | 10/2003 | Gidwani | H04L 29/06027 370/353 |
| 6,873,861 B2* | 3/2005 | Awada et al. | 455/566 |
| 2004/0030598 A1* | 2/2004 | Boal | G06Q 30/02 705/14.25 |
| 2004/0119758 A1* | 6/2004 | Grossman et al. | 345/839 |
| 2007/0223683 A1* | 9/2007 | Pearson | 379/355.01 |
| 2008/0065737 A1* | 3/2008 | Burke et al. | 709/217 |
| 2008/0235012 A1 | 9/2008 | Gibbon et al. | |
| 2008/0235740 A1* | 9/2008 | Gupta et al. | 725/86 |
| 2009/0069000 A1* | 3/2009 | Kindberg et al. | 709/217 |
| 2009/0327894 A1* | 12/2009 | Rakib et al. | 715/719 |
| 2010/0154007 A1* | 6/2010 | Touboul | G06Q 30/02 725/60 |
| 2010/0235765 A1* | 9/2010 | Worthington | 715/760 |

OTHER PUBLICATIONS

Publisher: www.car.com Title: www.car.com Pertinent p. 1 Date: Apr. 24, 2008.*
Publisher: www.car.com Title: www.car.com/about us Pertinent p. 1 Date: Apr. 24, 2008.*

(Continued)

*Primary Examiner* — Syling Yen
(74) *Attorney, Agent, or Firm* — Gowling WLG (Canada) LLP

(57) ABSTRACT

The invention provides a method comprising, receiving an indication of a desire for contact information associated with given media content, obtaining the contact information associated with the given media content in response to the indication and causing the obtained contact information to be stored in a database associated with a given party.

20 Claims, 6 Drawing Sheets

(56) References Cited

OTHER PUBLICATIONS

International Search Report dated Sep. 24, 2009 in connection with International patent application PCT/CA2008/002295.
Written Opinion of the International Searching Authority dated Sep. 24, 2009 in connection with International patent application PCT/CA2008/002295.

* cited by examiner

METHOD AND SYSTEM FOR STORING CONTACT INFORMATION IN A NETWORK CONTACT DATABASE

FIELD OF THE INVENTION

The present invention relates generally to the field of network contact databases, and more particularly to a method and system for enabling a user to quickly and easily add contact information to a network contact database.

BACKGROUND

Many people who use network devices, such as cell phones, are associated with a network contact database (otherwise known as a network address book) in which contact information associated with their contacts is stored. In this manner, a user's address book is not located locally within their cell phone. As such, the size of the network address book is not limited by the memory space within the cell phone, nor is all a user's contact information lost if the cell phone is lost or damaged. As such, there are numerous advantages to having a network address book.

Typically, in order for a user to add contact information to their network address book, the user must manually enter the contact information (the contact's name, phone number, fax number, address, etc. . . . ) and then indicate that it should be stored to their network address book. This can be both time consuming and inconvenient for a user.

Thus, there remains a need in the industry to provide a technological solution that alleviates, at least in part, some of the deficiencies associated with the manner in which contact information is entered and stored into a network address book.

SUMMARY OF THE INVENTION

In accordance with a first broad aspect, the invention provides a method comprising, receiving an indication of a desire for contact information associated with given media content, obtaining the contact information associated with the given media content in response to the indication and causing the obtained contact information to be stored in a database associated with a given party.

In accordance with a second broad aspect, the invention provides a system comprising an input for receiving an indication that a given party desires contact information associated with given media content, and a processing unit for obtaining the contact information associated with the given media content and causing the obtained contact information to be stored in a database associated with the given party.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION OF NON-LIMITING EMBODIMENTS

Figure 1:
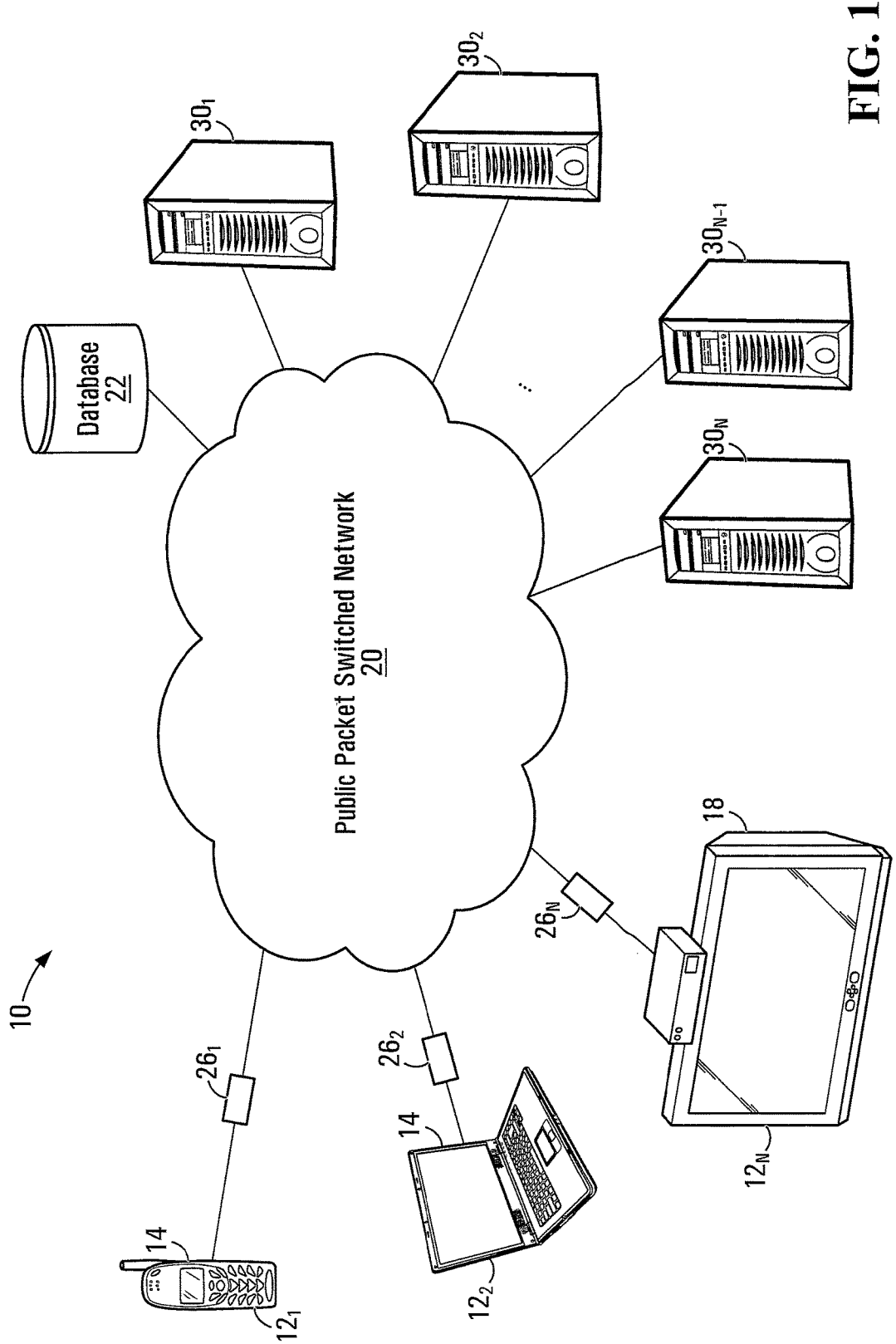
FIG. 1 shows a network architecture in accordance with a non-limiting embodiment of the invention that comprises a plurality of network devices in communication with a packet switched network 20.

FIG. 1 depicts an architecture 10, in accordance with a non-limiting example of implementation of the present invention that allows users of network devices $12_{1-N}$ that are connected to a packet-switched network 20 (e.g., the Internet) to access and interact with media content (e.g., web sites, IPTV channels, etc) over the packet-switched network 20.

In the embodiment shown in FIG. 1, the network devices $12_{1-N}$ are embodied as a hand-held communication device 14, a computer 16 and an IPTV set-top box 18. It should, however, be appreciated that the network devices $12_{1-N}$ can be embodied as any type of communication device or computing device that can communicate with the packet-switched network 20. For the purposes of the present description, each of the network devices $12_{1-N}$ will be referred to in the singular as a network device 12.

Figure 2:
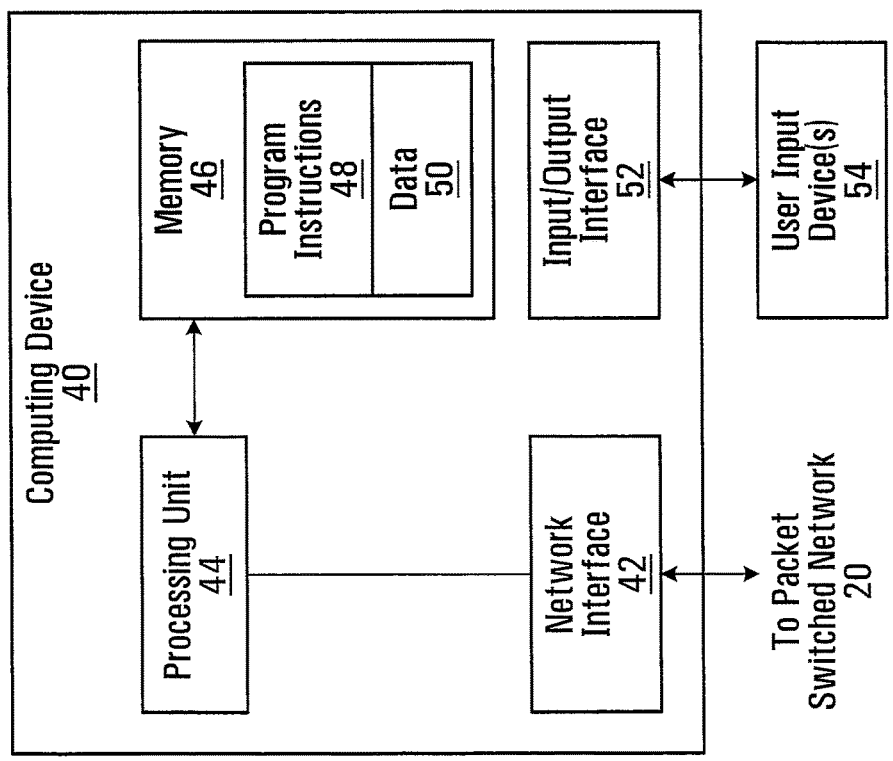
FIG. 2 shows a non-limiting functional block diagram of a network device in accordance with the present invention.

Shown in FIG. 2 is a non-limiting functional block diagram illustrating at least some of the functional components implemented at each of the network devices $12_{1-N}$. As shown, each of the network devices $12_{1-N}$ comprises a computing device 40 that includes a processing unit 44 communicatively connected to a memory unit 46. The memory unit 46 includes data 50 and program instructions 48 that are adapted for being processed by the processing unit 44 for implementing the functionality of the network device 12. The computing device 40 may also comprise a number of interfaces, such as an input/output interface 52 and a network interface 42, for receiving and/or sending data elements to/from external devices or networks. For example, the input/output interface 52 can be operative for receiving signals from one or more user input devices 54, or for transmitting signals to one or more output devices such as a screen or speakers, among other possibilities. The network interface 42 allows the computing device 40 to exchange signals with the public packet switched network 20. Although the network interface 42 is shown as being included within the computing device 40, it should be appreciated that the network interface 42 could be a separate component, such as a separate modem, that is connected to the computing device 40 through a wireless or wireline connection link.

It should be appreciated that depending on the specific implementation of the network devices $12_{1-N}$, the functional block diagram shown in FIG. 2 may comprise other functional components.

In the case of the hand-held communication device 14, the computing device 40 can be implemented as a web-enabled cellular phone, a smart-phone, a web-enabled PDA, or any other form of hand-held communication device that is capable of communicating with the packet-switched network 20. The computing device 40 is in communication with one or more user input device(s) 54, via the input/output interface 52, so as to enable interaction between a user and the computing device 40. The user input device(s) 54 can be a keypad, a keyboard, a touchscreen, a pointing device, a stylus, a microphone, etc. The user input device(s) 54 can be integral with the hand-held communication device 14 (such as in the case of a built in keypad or pointing device) or could be separate from the communication device (such as a stylus, or a keyboard) and connected to the hand-held communication device 14 via a USB port, a micro-USB port, a mini-USB port or a fire-wire port, among other possibilities. The network interface 42 enables the hand-held communication device 14 to exchange data with the public packet-switched network 20. For example, the network interface 42 may be implemented as a wireless modem that is integrated into the computing device 40 (e.g., it may be a card internal to the computing device 40). The computing device 40 is operative to run a software application (that is most likely stored within the memory 46) implementing a network browser (e.g., a web browser) with which a user can interact via a display and the user input device(s) 54 (as well as possibly one or more other output devices), in order to access and interact with network sites of the packet-switched network 20.

In the case of the computer 16, the computing device 40 may be implemented as a personal computer (PC) such as a desktop computer, a laptop computer, or a tablet PC. The computing device 40 is in communication with one or more user input device(s) 54 via the input/output interface 52 so as to enable interaction between a user and the computing device 40. The user input device(s) 54 can include a keyboard, a mouse, a touchscreen, a stylus, a microphone, etc. It should also be appreciated that the user input device(s) 54 can be integral with the computer 16 (such as in the case of a keyboard) or could be separate from the computer 16 (such as a mouse or a USB or wireless keyboard) and connected to computer 16 via a USB port, a micro-USB port, a mini-USB port or a fire-wire port, among other possibilities. The network interface 42 enables the computer 16 to exchange data with the packet-switched network 20. The network interface 42 may be implemented as a modem such as a broadband modem (e.g., a digital subscriber line (DSL) modem or a cable modem) or a narrowband modem (e.g., a dial-up modem). Although the network interface 42 is shown in FIG. 2 as being an integral part of the computing device 40, it should be appreciated that it could be a separate component that is connected to the computer 16 in manners known in the art. The computing device 40 is operative to run a software application implementing a network browser (e.g., a web browser) with which a user can interact via the display and the one or more user input device(s) 54 (as well as possibly one or more other output devices) in order to access and interact with network sites of the public packet-switched network 20.

In the case of the IPTV set top box 18, the computing device 40 may be implemented as an IPTV set top box, or an actual television that includes built in IPTV functionality. The computing device 40 is in communication with one or more user input device(s) 54 via the input/output interface 52, so as to enable interaction between a user and the computing device 40. The user input device(s) 54 can include a keyboard, a remote control device or a game-controller among other possibilities. The user input device(s) 54 can be integral with the computing device 40, such as in the case of a keypad on the set top box, or could include a separate component, such as a remote control device that has RF or infrared communication capabilities for transmitting signals to the IPTV set top box 18. The network interface 42 enables the IPTV set-top box 18 to exchange data with the public packet-switched network 20. The network interface unit 42 may be implemented as an Ethernet cable, a satellite dish, a coaxial cable, a telephone line (including DSL connections) or broadband over power line. In the case of an "Ethernet" arrangement, the network interface unit 42 would communicate with a router that is connected to a DSL modem that is connected to the network. In the case of broadband over powerline, a similar interface connection would be established. In the case of a satellite dish, a coax interface is connected to the satellite dish which is connected to a network. The computing device 40 is operative to run a software application implementing an IPTV interface with which a user can interact via the TV display and the at least one input device 54 (as well as possibly one or more other output devices) in order to interact with sources of IP video content over the public packet-switched network 20.

In the case where the media content is provided to a television set top box via a satellite or cable source, then the media content is unidirectional from the Satellite/Cable to the set top box. In such a circumstance, the computing device 40 within the set top box is able to communicate with the packet switched network via a modem or broadband connection.

The network devices $12_{1-N}$ are capable of exchanging data with the public packet-switched network 20 via various network portions $26_{1-N}$. The network portions $26_{1-N}$ may traverse one or more network components and may comprise one or more physical links and one or more logical links. For example, the network portions $26_{1-N}$ may comprise a physical link between the network interfaces 42 and a network component such as a DSL access multiplexer (DSLAM), a cable modem termination system (CMTS), or another type of network component. The physical link may comprise a copper twisted pair, a coax cable, an Ethernet link, a fiber optic link (e.g., fiber to the premises (FTTP)), a wireless link, a satellite link, or a combination thereof. The network portions $26_{1-N}$ may also comprise a dedicated logical link between two network components that provides access to the packet-switched network 20. The network components may further include a network access server (NAS), a router, etc. It will be appreciated that the network portions $26_{1-N}$ may take on many forms in various embodiments.

In order to exchange data over the packet-switched network 20, each network device $12_{1-N}$ (or its associated network interface 42) is assigned a logical identifier, which may be an Internet Protocol (IP) address (e.g., in compliance with IPv4 or IPv6) or a proprietary address, label or tag. A logical identifier may be statically assigned to one or more of the network device $12_{1-N}$ in which case it does not change over time (e.g., a static IP address), or the logical identifier may be dynamically assigned to one or more of the network devices $12_{1-N}$ in which case it may change over time (e.g., a dynamic IP address).

In order to be able to access the packet-switched network 20, each of the network devices $12_{1-N}$ has an account or profile with a service provider that provides network access (in this case, to the public packet-switched network 20). Each of the network devices $12_{1-N}$ can have an account with the same service provider, or with different service providers, respectively. The service provider can be a communications service provider (CSP) such as an access service provider (ASP, also sometimes called a regional access network provider (RANP)) that may or may not be an internet service provider (ISP). The service provider operates a network component (such as a NAS) that allows the network devices $12_{1-N}$ to access the public packet-switched network 20.

In accordance with a non-limiting embodiment, the service provider maintains a database (not shown) containing account information associated with the network devices $12_{1-N}$ to which a network access service is provided. The account information may take on many forms in various different embodiments. In general, the account information includes an account number or code, as well as personal information regarding a party (which may or may not be the user of the network device 12). For instance, this personal information may include any one or more of a name, an age, a correspondence language, a civic address (e.g., a residential or work address), a phone number (e.g., a residential, work, VoIP or mobile phone number), an email address, a SIP address, an instant messaging (IM) identifier, and/or financial information (e.g., credit or debit card information, bank account information, or other information used to pay for the network access service) of the party. The personal information regarding the party may be obtained by the service provider as a result of interaction between the party and the service provider (e.g., during a registration or service activation phase).

These examples of account information potentially included in a database managed by the service provider are presented for illustrative purposes only and should not be considered limiting in any respect.

In addition, the packet switched network 20 includes one or more network contact databases for storing contact information belonging to respective parties. These network contact databases may be implemented and managed by the service provider, or any other entity, such as Google, Microsoft. These network contact databases are associated with a given party via a unique identifier, and allow users or members of the given party to store contact information therein. The unique identifier may be associated with a user (such as a user's email address or account number), with a communication device (such as a phone number, a MAC address, or SIP address associated with the communication device), or with a group of users (such as a group email, or a group account or subscription number). A network contact database can be set up when a user registers with the service provider, or upon a request by a user to a company that manages these network contact databases, such as Google or Microsoft. At the time of set-up, the unique identifier that links a given party to an associated network contact database may be chosen by the service provider (or other provider of this network contact database service), or can be chosen by the subscriber.

As mentioned previously, the network devices $12_{1-N}$ can be used to interact with network sites and sources of IP video content via the public packet-switched network 20. These network sites and sources of IP video content are implemented by servers $30_1 \ldots 30_N$ connected to the public packet-switched network 20. The servers $30_1 \ldots 30_N$ and the network sites and sources of IP video content that they implement are operated, managed or otherwise associated with various entities, including, for example, the service provider, corporations, governmental organizations, non-profit organizations, and individuals.

Each of the servers $30_1 \ldots 30_N$ comprises suitable hardware, firmware, software, control logic, or a combination thereof for implementing a plurality of functional elements, including an interface and a processing unit. The interface of each of the servers $30_1 \ldots 30_N$ is adapted to receive and send data (e.g., in the form of packet-based messages) from and to network devices $12_{1-N}$ connected to the public packet-switched network 20 as well as other components (e.g., computers or databases) communicatively coupled to that server but not necessarily connected to the network 20. The processing unit of each of the servers $30_1 \ldots 30_N$ is adapted to effect various processing operations to implement that server's functionality.

When a user of one of the network devices $12_{1-N}$ accesses a network site or source of IP video content that is implemented by one or more of the servers $30_1 \ldots 30_N$, the computing device 40 implemented by the given network device 12, which may run a browser or other program suitable for accessing packet-based content, interacts with the one or more appropriate servers in order to allow a user of the given network device 12 to view, hear or otherwise be presented with online media content via the display and/or one or more other output devices of the computing device 40. While interacting with the network site or source of IP video content, the user may also input information (e.g., by entering text, selecting an option, etc.) and/or one or more commands (e.g., by clicking on a graphical button or a hyperlink) via at least one of the input devices 54 connected to the computing device 40.

The online media content presented to the user when he/she accesses or interacts with the network site, or source of IP video content, comprises various online content elements. An online content element can include any information visually and/or audibly presentable to the user when he/she accesses or interacts with the network site or source of IP video content. For example, an online content element may include text, one or more images, one or more videos; one or more sounds, one or more animations, one or more hyperlinks, one or more links to downloadable files, one or more interactive features (e.g., games, maps, etc.), and/or other information that can be presented to a user when he/she accesses or interacts with the network site or source of IP video content. In some cases, an online content element may constitute an entire online page (e.g., web page), while in other cases it may constitute a portion (e.g., text, an image, a video, and/or sound) of such a page. An online content element may also constitute a video stream for displaying an entire TV episode, or movie. In addition, in some cases, an online content element may be part of a window containing a currently-displayed page of the network site, while in other cases it may be part of another window (e.g., a pop-up window) that is separate from the window containing the currently-displayed page of the network site, or the window or screen containing the currently-displayed video stream.

Also, the online media content presented to the user when he/she accesses or interacts with a network site or source of IP video content that is implemented by one of the servers $30_1 \ldots 30_N$, comprises primary content and possibly advertising content.

The primary content serves to provide a primary function of the network site implemented by a server. For example: where the network site is a search engine site, the primary content serves to provide searching functionality and search results to the user of a network device 12; where the network site is a commercial site associated with a company, the primary content serves to provide information on the company or its products and/or services; where the network site is a personal site associated with a person, the primary content serves to provide information on the person; where the network site is a news site, the primary content serves to provide news; where the network site is a map and/or directions site, the primary content serves to provide maps and/or directions; etc.

The advertising content, if any, serves to provide one or more online advertisements. The online advertisement can be a paid or un-paid online announcement designed to attract public attention to promote, for instance, an entity (e.g., a company or other organization), a product, a service, or an event. For example, an online advertisement may be a banner ad, a vertical banner ad, a skyscraper ad, a pop-up ad, a pop-under ad, an interstitial ad, a floating ad, an expanding ad, a trick banner ad, a video ad, or any other type of online ad.

Referring back to FIG. 1, the architecture 10 includes a database 22 that is accessible via the public-packet switched network 20. It should be appreciated that the database 22 can be stored at one of the servers $30_{1 \ldots N}$ or can be stored at a location that is accessible to one or more of the servers $30_{1 \ldots N}$, via the public switched network 20. This database 22 can be managed by a network service provider, or by other entities that offer network services.

Figure 3:
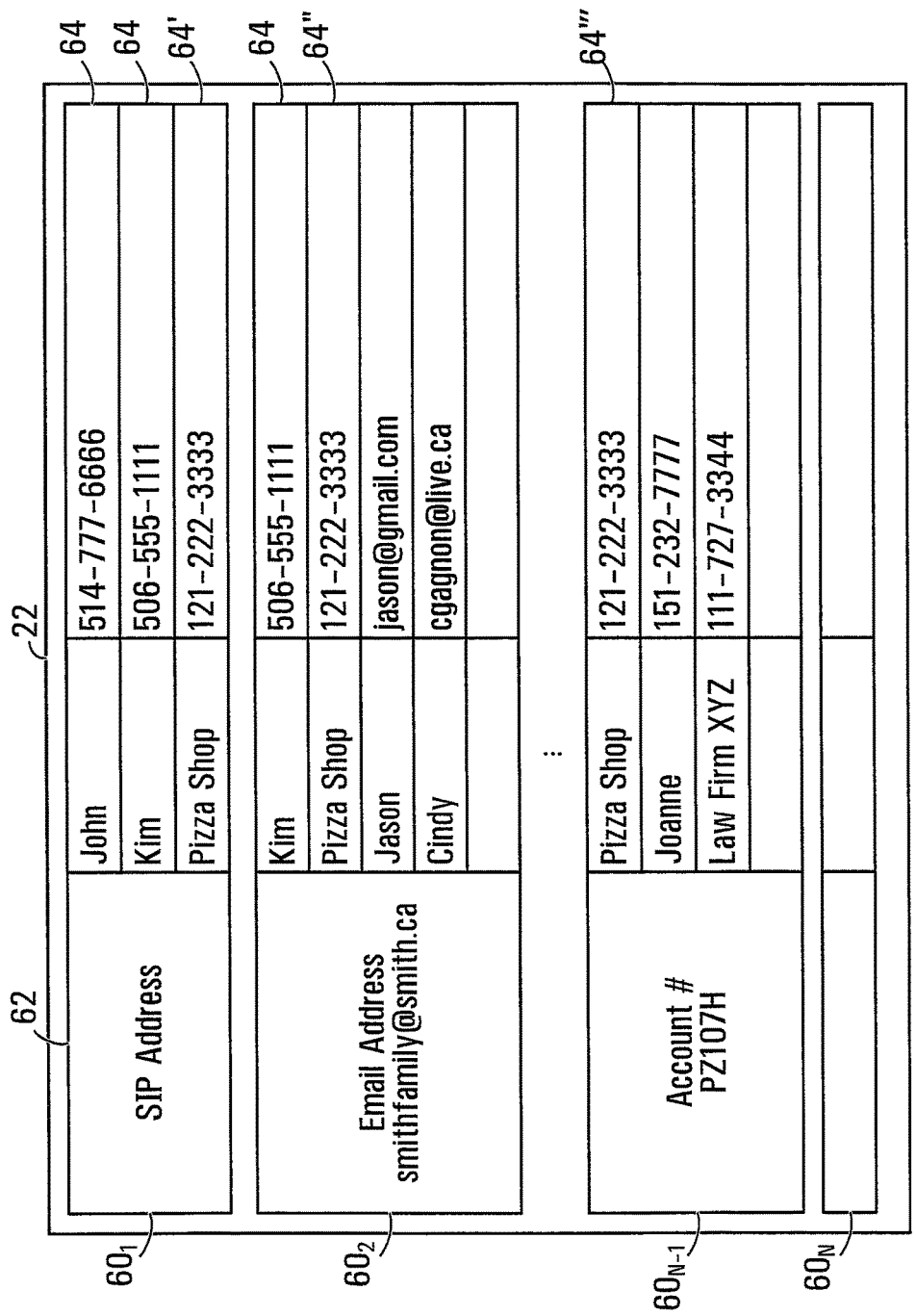
FIG. 3 shows a non-limiting example of potential contents of a database containing a plurality of network contact databases for storing contact information.

Shown in FIG. 3 is a non-limiting example of the potential contents of the database 22. For the purposes of the present invention, the database 22 includes one or more network contact databases $60_{1-N}$ that each store contact information associated with a given party.

An advantage of storing contact information belonging to a given party within a network contact database is that the contact information stored within the network contact database can be accessed by the given party irrespective of the communication device being used.

Although database 22 is depicted in FIG. 3 as being one component, the database 22 may be distributed in nature. For example, the database 22 can have portions of its content stored in different data storage media possibly located in different network components of the packet switched network 20.

As will be described in more detail below, in accordance with the present invention, a user of a network device 12 is able to cause contact information associated with given media content that is displayed, or otherwise presented to a user of that network device 12, to be stored in a network contact database $60_{1 \ldots N}$ associated with a given party. The given party may be the user of that network device 12, or the given party may be a group of people, such as a family or a business group, wherein the user of that network device 12 is a member of the group. In yet a further alternative, the given party may be the network device itself, such that regardless of who is using the network device 12, media content that is identified by any user of the network device 12 is stored to the same network contact database associated with that particular network device 12.

In the embodiment shown in FIG. 3, the database 22 includes a plurality of network contact databases $60_{1 \ldots N}$. Each of the network contact databases $60_{1} \ldots$ includes a unique identifier 62 for associating the respective network contact database with a given party. The unique identifier 62 could be an account number, a subscriber number, an email address, a phone number or a SIP address, among other possibilities. In addition, each of the network contact databases $60_{1 \ldots N}$ includes a plurality of entries 64. Each of the entries 64 includes contact information for contactable entities, such as individuals, companies, service providers, etc. The contact information may include a name of an individual or company, one or more phone numbers, one or more fax numbers, one or more email addresses, physical address information, website address (URL), and/or any other relevant contact information for the contactable entity.

In the embodiment shown, network contact database $60_1$ is associated with hand-held communication device 14, and the unique identifier 62 for associating this network contact database $60_1$ with hand-held communication device 14 includes a SIP address associated with the user. The network contact database $60_2$ is associated with a group of users of computer 16; namely the Smith family. The unique identifier 62 for associating this network contact database $60_2$ with the Smith family includes an email address for the Smith family. The network contact database $60_{N-1}$ is associated with IPTV set-top box 18, and the unique identifier 62 for associating this network contact database $60_{N-1}$ with the IPTV set-top box 18 includes an account number associated with the IPTV set-top box 18.

It should be appreciated that although each contact database 60 shown includes only one unique identifier 62 associated therewith, each contact database 60 could be associated with a plurality of unique identifiers 62 for different network devices associated to a given party. For example, the database $60_2$ associated with the Smith Family includes a unique identifier 62 that is an email address associated with the Smith Family. Database $60_2$ could also have included one or more telephone numbers associated with cellular phones belonging to the members of the Smith Family. In such a manner, the members of the Smith Family would be able to add contact information to, and retrieve information from, the contact database $60_2$ with each of these network devices.

In some cases, a given contact database 60 may be associated with a plurality of different kinds of network devices 12, such as a cell phone, a computer having an IP address, an TV having an IPTV account number, etc. As such, the contact information can be caused to be stored in the contact database 60, and retrieved from the contact database 60, via any of these network devices 12.

When users of the network devices $12_{1 \ldots N}$ access the public packet-switched network 20, media content from network sites (or sources of IP video content) is displayed, or otherwise provided, to those users of the network devices $12_{1 \ldots N}$. In accordance with the present invention, when a user of a network device 12 is presented with media content, the user can provide an indication that contact information associated with that media content is desired to be stored. By so doing, the contact information will be obtained and stored to a network contact database associated with a given party. The present invention will now be described in more detail with respect to the flow chart shown in FIG. 4.

Firstly, in operation, a user of a network device 12 interacts with a network site or source of IP video content that is implemented by one or more of the servers $30_1 \ldots 30_N$, such that the user is presented with online media content via a display and/or one or more other output devices of the network device 12. While the user is presented with the media content, the user may decide that he/she would like to store contact information associated with the given media content. In accordance with the present invention, the user is thus able to provide an indication that contact information associated with the media content is desired to be stored, such that at step 70, the computing device 40 receives the indication indicative of a desire for storing the contact information associated with the given media content.

The indication of a user's desire for the contact information associated with the given media content to be stored can be provided via a user input device 54 that is activated by the user. This will now be described in the context of the hand-held communication device 14, the computer 16 and the IPTV set top box 18.

Figure 5:
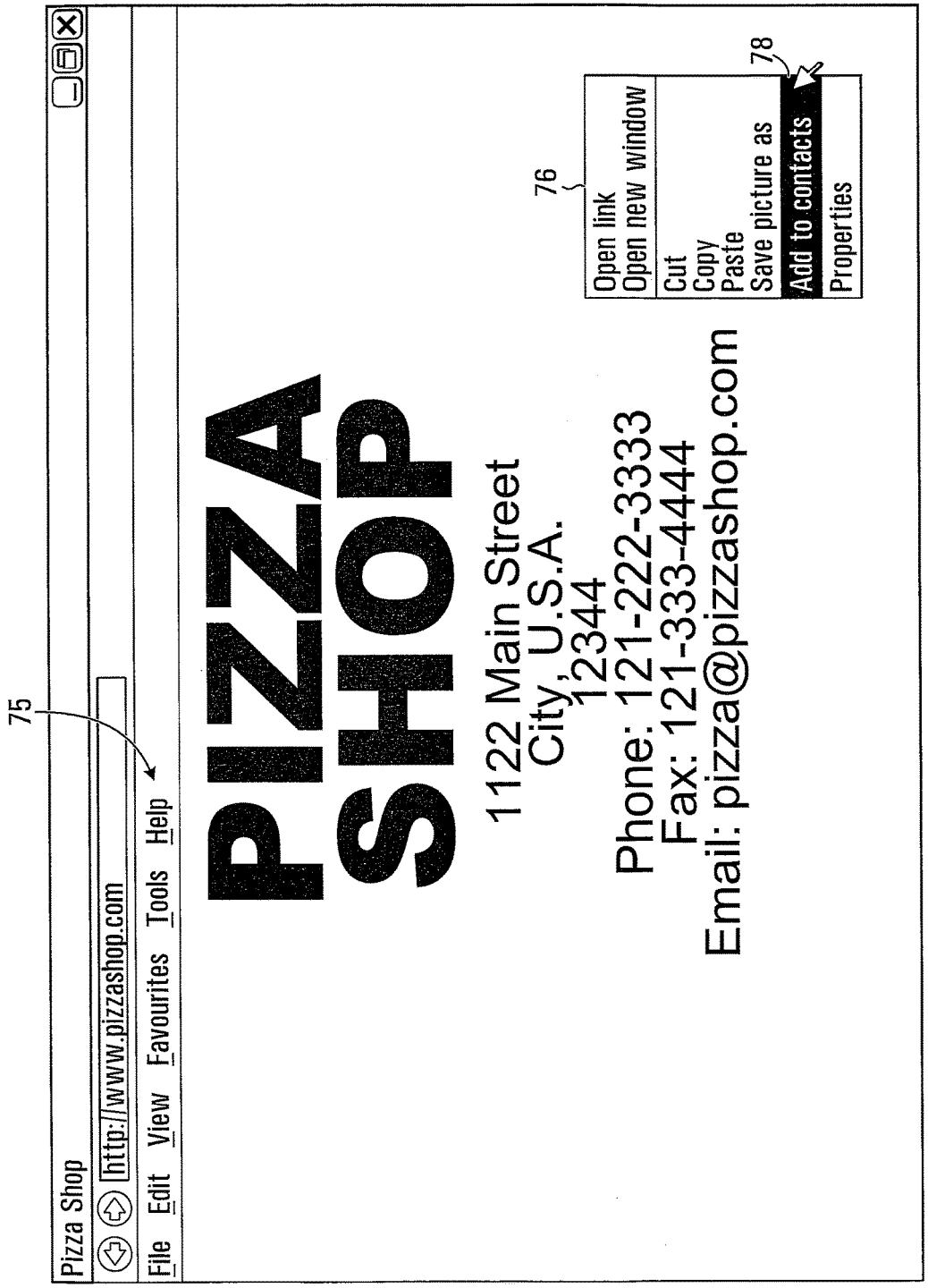
FIG. 5 shows a non-limiting example of a display screen on which a user can identify contact information to be stored in a database associate with the user.

In the case of the hand-held communication device 14 or the computer 16, the user generally interacts with a network site via a web-browser implemented by the computing device 40. Shown in FIG. 5, is a non-limiting example of media content that can be displayed to a user of either the hand-held communication device 14 or the computer 16, via a web-browser.

In the example shown, a user has accessed a web-page for a pizza shop that includes contact information for that pizza shop. In order to provide an indication that contact information associated with the pizza shop is desired to be stored, a user activates a user input device 54, such as a mouse. In accordance with the non-limiting example shown, the user right-clicks the mouse, such that a menu 76 appears on the screen and provides an option 78 that can be selected by the user for indicating that the contact information associated with the given media content is desired to be stored. In the example shown, the menu 76 includes an option 78 entitled "Add to contacts". It should be appreciated that this option 78 could have numerous different names without departing from the spirit of the invention, such as "store contact information", "save contact" etc. . . . . By selecting the "Add to contacts" option 78 in the menu, the user provides an indication to the computing device 40 of a desire for storing the contact information associated with the media content. In an alternative embodiment, the menu 76 may be caused to appear by using the mouse to click on a drop-down menu in the task bar 75.

Although the example of selecting from a menu is given above, it should be appreciated that any type of input via a user input device 54 that is in communication with the computing device 40 can be used by the user for providing an indication that contact information associated with given media content is desired to be stored. For example, the pressing of a combination of keys on a keypad or keyboard, or providing a voice indication such as "save contact" to a microphone, could all be used to provide an indication to the computing device 40 of a desire for contact information associated with given media content to be stored.

In the case of an IPTV set top box 18, a user can view media content in the form of TV and/or movie video streams provided by sources of IP video content of the packet-switched network 20. In order to provide an indication that contact information associated with the media content is desired to be stored, a user can activate a user input device 54, such as a remote control that is in communication with the computing device 40 of the IPTV set top box 18. For example, by pressing a dedicated button on a remote control, the user can provide an indication that contact information associated with the given media content is desired to be stored. In this manner, the computing device 40 will receive the indication from the remote control device. Alternatively, the user can use the remote control device to cause an interactive menu to be displayed on the display screen of the TV, such that an option from the menu can be selected in order to indicate to the computing device 40 that contact information associated with the media content is desired for storage. As mentioned above, alternative input devices, such as a microphone, a touch pad or keyboard can also be used for enabling a user to provide an indication that contact information associated with given media content is desired for storage.

At step 72, in response to receipt of the indication that contact information associated with the media content is desired, the computing unit 40 proceeds to obtain the contact information associated with the media content. This can be done in a variety of different manners.

In accordance with a first non-limiting example of implementation, the computing device 40 is able to obtain the contact information associated with the media content that is displayed via a text recognition process. This text recognition process may be executed by the processing unit 44 on the basis of software or other program instructions stored within the memory 46. Software and/or program instructions for performing text recognition, and for determining contact information from the recognized text, are known in the art, and as such will not be described in more detail herein.

In the non-limiting example shown in FIG. 5, the website includes contact information associated with the pizza shop. Using the text recognition process, the processing unit 44 of the computing device 40 is able to recognize the text of the contact information, and identify that the recognized text is contact information.

It should be appreciated that this text recognition process may occur only when a user provides an indication that contact information associated with the media content is desired. Alternatively, this text recognition process may occur whenever the user accesses new media content (such as a new web page), such that even before a user provides an indication of a desire for contact information associated with that media content to be stored, the processing unit 44 of the computing device 40 has already identified whether or not the web page includes text that could potentially be contact information. In such an embodiment, when the processing unit 44 has determined that the media content being displayed includes contact information, the processing unit 44 will cause the "add to contacts" option in the menu 76 to be enabled when a user right clicks the mouse or requests the menu from the task bar. Whereas, if the processing unit 44 has determined that the media content being displayed does not include any contact information, then if a user right clicks the mouse, the "add to contacts" option 78 will not be enabled, such that a user cannot provide an indication that media content is desired.

In the example shown in FIG. 5, the contact information is displayed in the media content that is provided to a user. It should be appreciated that in an alternative embodiment, the user may access the "pizza shop" website but not be able to find a web page that actually displays contact information. Even if contact information is not readily visible, a user can still provide an indication that contact information associated with the given media content is desired for storage.

For example, in certain cases a user may access the "pizza shop" home page, which provides information about "pizza shop", but does not include the pizza shop contact information thereon. In such a case, the user can still provide an indication that contact information associated with the media content is desired for storage. This can be done by accessing a menu and selecting an "Add to contacts" option, or by providing an indication in any other manner described above. In such a case, given that the media content being provided to the user relates to "pizza shop", even though no contact information is presented on the home page, upon receipt of the indication from a user that contact information is desired, the computing device 40 will realize that the user is requesting contact information associated with "pizza shop". The computing device 40 will then obtain information associated with "pizza shop".

In accordance with a non-limiting example of implementation, the contact information can be obtained by the computing device 40 on the basis of information supplied by the media content provider. For example, in the case where the media content is a web page, the contact information may be embedded within html code, or other code used for creating the web-page or pages being displayed. As such, in the example provided above, in the case where the media content being presented to a user is the "pizza shop" home page, the contact information may be embedded within the webpage code. In the case where the media content being displayed is a packet-based video stream, the contact information may be embedded within the video stream. In such circumstances, the processing unit 44 is operative for obtaining the contact information by extracting it from the embedded information provided by the media content provider.

In yet a further non-limiting example of implementation, the computing device 40 may obtain the contact information on the basis of a request submitted to a network entity. Keeping with the example described above wherein the "pizza shop" home page does not include any contact information thereon, upon receipt of an indication from a user of a desire for contact information associated with "pizza shop", the processing unit 44 may issue a request via the network interface 42 to a network entity via the packet-switched network 20 that stores contact information associated with a variety of different entities and/or organizations.

For example, in the case of the "pizza shop" homepage, upon receipt of an indication from a user that contact information associated with "pizza shop" is desired, the processing unit 44 may generate and issue a request to a network entity for contact information associated with "pizza shop". In such an embodiment, the processing unit 44 is aware of the network address of this network entity, such that the processing unit 44 can obtain from the network entity the requested contact information. The network entity may be a server that manages a database that stores contact information for a variety of organizations. For example, the network entity may act as a type of "yellow pages directory", such that contact information for almost any and all service providers, organizations and/or individuals can be obtained.

In the case of the IPTV set top box 18, the media content that is provided to a user is IP video content. In such a situation, the source of the IP video content may store contact information associated with the IP video content in a database, such that upon request, the source of the IP video content can provide the contact information to a computing device 40. For example, each time the source of the IP video content receives IP video content (which could be in the form of a TV episode, a movie, a commercial, etc) that it intends to make available to users through the IPTV set top box 18, the source of the IP video content also obtains contact information associated with that IP video content. This contact information can be stored in a database, such that if the source of IP video content receives a request from an IPTV set top box 18 for contact information associated with media content that is being displayed through the IPTV set top box 18, then the source of IP video content will be able to provide this information.

As an example, assume that the source of IPTV video content agreed to broadcast a commercial for "pizza shop". At the time of obtaining the IP video stream for the commercial, the source of IP video content would associate the commercial with contact information for pizza shop, which could be stored in a database at the source of IP video content. As such, if the IPTV set top box 18 gets a request for contact information associated with the commercial for pizza shop, the source of IP video content can provide the computing device 40 of the IPTV set top box 18 with the contact information.

In accordance with a further example, assume that the source of IPTV video content obtains IP video stream packets for a new movie that it plans to make available to users through the IPTV set top box 18, and assume that the movie includes many product or service promotions (such as the actors eating pizza from "pizza shop", or the actors visiting a trendy restaurant), then the source of IP video content can also receive contact information that is associated to given time periods within the movie. As such, if a user is watching the movie via their IPTV set top box 18, and sees that the actor's are eating "pizza shop" pizza, the user may decide that he/she wants the contact information for "pizza shop". The user can then provide an indication via a user input device (such as a remote control) of a desire for contact information associated with the given media. Upon receipt of this indication, the computing device 40 may issue a request to the source of the IP video content for contact information associated with the given media content. This request may indicate the time period in the movie where the indication that contact information was desired was received from a user. As such, the source of IP video content will be able to map that time period with contact information for the product or service that is being displayed at that point. For example, if it is known that the user entered the indication 20 minutes into the movie, the source of IP video content may know that at the 20 minute mark, "pizza shop" pizza was being displayed. As such, the source of IP video content would return contact information associated with domino's pizza.

Alternatively, this contact information that is associated with different time periods within the movie can be embedded within the IP video packets such that the computing device 40 can determine the appropriate contact information without having to contact the source of IP video content.

Finally, at step 74, once the computing device 40 has obtained the contact information associated with the given media content, the computing device 40 causes the contact information to be stored in a database associated with a given party. As mentioned above, the given party may be an individual, a group or a network device.

In order to cause the contact information that has been obtained to be stored in a network contact database associated with a given party, the computing device 40 transmits the contact information, together with a unique identifier, to a network entity, such as a database management server. The database management server can be implemented at one or more servers $30_1 \ldots _N$, and is operative for causing the contact information to be stored into an appropriate network contact database.

In order to provide the database management server with the contact information, the computing unit 40 knows the network address of the database management server, such that the information is routed to the appropriate network entity. This network address can be stored within the memory 46 of the computing device 40.

The manner in which the computing device 40 causes the contact information to be stored in a database associated with a given party will now be described in more detail with respect to each of the hand-held communication device 14, the computer 16 and the IPTV set-top box 18.

In the case of the hand held communication device 14, once the processing entity 44 has obtained the contact information, the contact information is sent, together with a unique identifier associated with a given party, to a network address of a database management server (which could be any one or more of the servers $30_{1\ldots N}$). This information is issued to the database management server via the network interface 42 over the packet-switched network 20. The unique identifier associated with the given party is then used by the database management server for identifying the database associated with the given party. For the sake of example, the given party is the hand-held communication device 14, and the unique identifier for identifying the database associated with the hand-held communication device 14 is the SIP address of the hand-held communication device 14.

Once the database management server receives the contact information and the unique identifier (the SIP address), the server accesses the database 22 and determines that it is the network contact database $60_1$ that is associated with the hand held communication device 14. In accordance with a non-limiting example of implementation, this determination can be done on the basis of a comparison algorithm that compares the unique identifier provided by the hand held communication device 14 with the unique identifier of each of the network contact databases $60_{1\ldots N}$.

Once the database management server has identified the network contact database $60_1$ that is associated with the hand-held network device 14, the server 30 then proceeds to add the contact information to the network contact database $60_1$, for example as a new entry 64'. In this manner, the contact information desired by the user of the hand-held communication device 14 is stored into the network contact database $60_1$ associated with the hand-held communication device 14.

When the computing device 40 issues the message containing the contact information and the unique identifier associated with the given party to the network address of the appropriate database management server, the computing device 40 may also provide instructions to the database management server as to how to handle the information being sent. Alternatively, the database management server may not require instructions, and may already include logic and program instructions for handling the information that arrives from different network devices $12_{1\ldots N}$.

In the case of the computer 16, once the processing entity 44 has obtained the contact information, it sends the contact information together with a unique identifier associated to a given party to a network address of a database management server (which could be any one of servers $30_{1-N}$). This information is issued to the database management server via the network interface 42 over the packet-switched network 20. The unique identifier is then used by the database management server for identifying the particular network contact database associated with the given party. For the sake of example, the given party is the Smith family that uses computer 16, and the unique identifier for identifying the Smith family is the email address of the Smith family; namely smithfamily@smith.ca.

Once the database management server receives the contact information and the unique identifier (the email address), the database management server accesses the database 22 and determines that it is the network contact database $60_2$ that is associated with the Smith family. In accordance with a non-limiting example of implementation, this determination can be done by a comparison algorithm for comparing the unique identifier provided by the computer 16 with the unique identifier of each of the network contact databases $60_{1\ldots N}$.

Once the database management server has identified the network contact database $60_2$ that is associated with the Smith Family, the server 30 then proceeds to add the contact information to the network contact database $60_2$ as a new entry 64". In this manner, the contact information that was indicated as being desired by a user for storage is stored into the network contact database $60_2$ associated with the Smith family.

In the case of the IPTV set-top box 18, once the processing entity 44 has obtained the desired contact information, it sends this contact information together with a unique identifier to a network address of a database management server (which could be any one of servers $30_{1\ldots N}$). This information is issued to the database management server via the network interface 42 over the packet-switched network 20. The unique identifier is used by the database management server for identifying the network contact database associated with the given party. For the sake of example, the given party is the subscriber or subscribers of the IPTV service, and the unique identifier for identifying the subscriber(s) is the account number associated with the IPTV service.

Once the database management server receives the contact information and the unique identifier (in this case, the account number), the server accesses the database 22 and determines that it is the network contact database $60_{N-1}$ that is associated with the subscribers of the IPTV service. In accordance with a non-limiting example of implementation, this determination can be done by a comparison algorithm for comparing the unique identifier provided by the IPTV set-top box 18 with the unique identifier of each of the network contact databases $60_{1-N}$.

Once the database management server has identified the network contact database $60_{N-1}$ that is associated with the subscriber(s) of the IPTV service, the server 30 then proceeds to add the desired contact information to the network contact database $60_{N-1}$ as a new entry 64'''. In this manner, the contact information that was indicated as being desired by a person watching the IPTV video stream is stored into the network contact database $60_N$ associated with the subscribers of the IPTV service.

The method described above for allowing a user to indicate that contact information associated with given media content is desired, and then causing the contact information to be stored in a network contact database associated with a given party, is implemented by the computing device 40 of each of the network devices $12_{1\ldots N}$. The logic, data and program instructions for allowing the computing device 40 to implement the above described method are stored in the data 50 and program instructions 48 of the memory 46. In accordance with a non-limiting embodiment, this functionality can be built into the computing device 40 such that the functionality is included in the network device 12 when a user purchases the network device 12 (whether it is the hand-held communication device 14, the computer 16, or the IPTV set to box 18).

Figure 4:
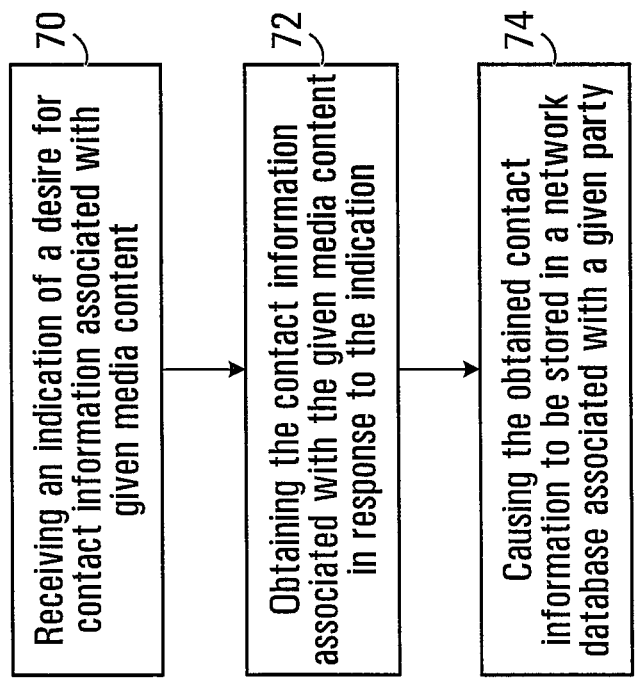
FIG. 4 shows a non-limiting example of a method for causing contact information to be stored in a network contact database.

Alternatively, the logic, data and program instructions for allowing the computing device 40 to implement the above described method of FIG. 4 can be provided to the computing device 40 via a plug-in to an existing set of program instructions. For example, in the case of the hand-held communication device 14 and the computer 16, the functionality may be provided to the computing device 40 in the form of a plug-in for a web-browser that is implemented at the computing device 40. In the case of the IPTV set top box 18, the functionality may be provided to the computing device 40 in the form of a plug-in for the existing program instructions that run on the IPTV set-top box. This plug-in can be downloaded from the packet-switched network 20, or can be obtained from a memory storage medium, such as a CD or a USB key, for example.

In yet a further example, instead of the functionality described above being provided in the form of a plug-in to an existing program, such as a web-browser program, the functionality can be provided in the form of a separate program that is dedicated to enabling a user to provide an indication that contact information associated to given media content is desired, determining the contact information and then causing that information to be stored in a network contact database.

In the embodiment described above, upon receipt of an indication from a user that contact information associated with given media content is desired, it is the processing unit 44 located within the computing device 40 that obtains the contact information and then provides the contact information, together with the unique identifier, to the database management server for causing the contact information to be stored in a network contact database. It should, however, be appreciated that in an alternative embodiment, at least a portion of the functionality described above with respect to FIG. 4 could be performed at a network processing entity (which could be part of the packet-switched network), instead of at the processing entity 44 of the computing device 40.

Alternative Embodiment

Figure 6:
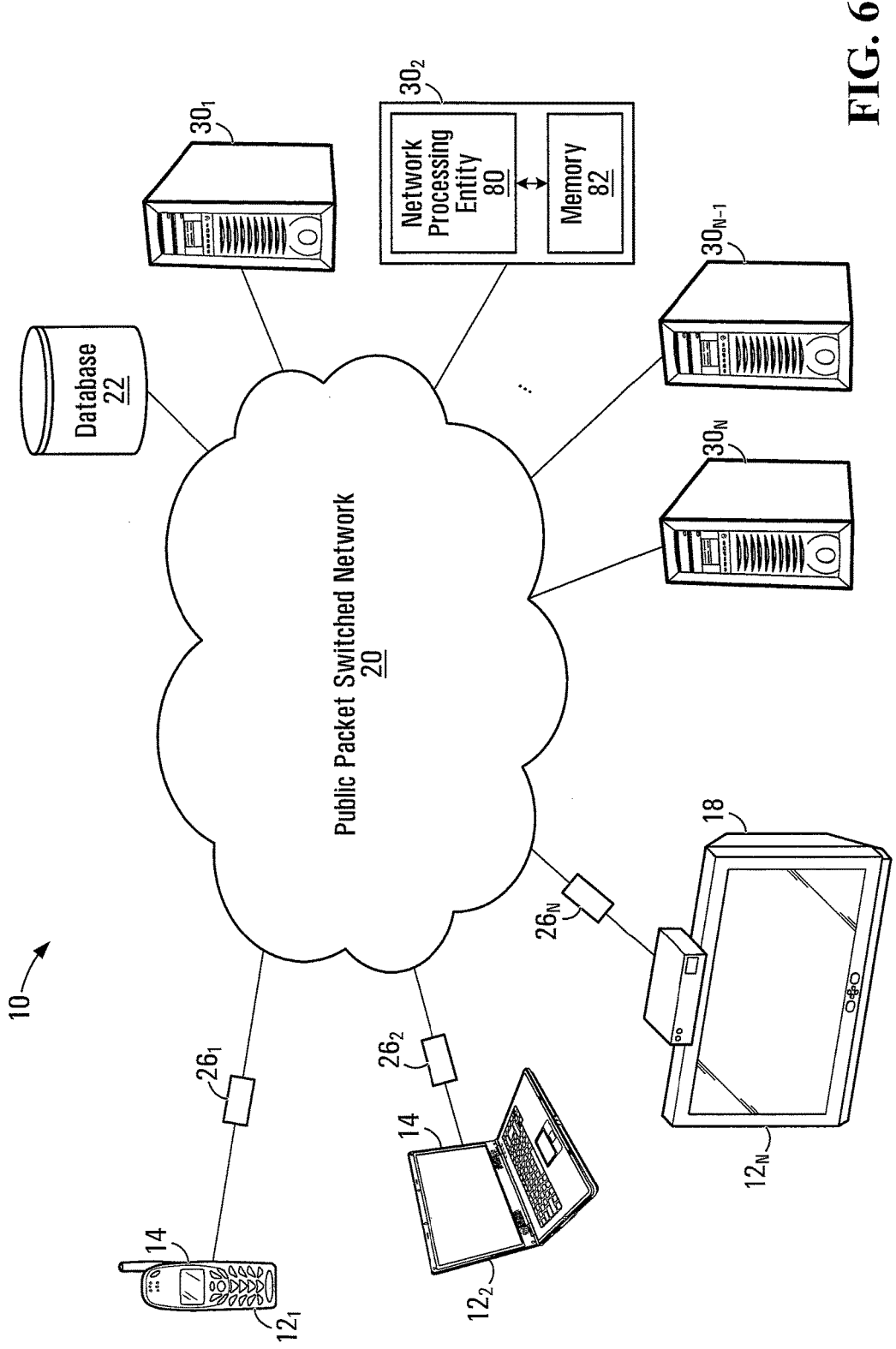
FIG. 6 shows a network architecture in accordance with an alternative non-limiting embodiment of the invention.

Shown in FIG. 6 is the network architecture 10, wherein a network processing entity 80 is implemented at network server $30_2$. In this alternative embodiment, the network processing entity 80 is in communication with a memory 82 and is operative for performing at least a portion of the functionality described above with respect to FIG. 4.

In this alternative embodiment, when a user of a network device $12_{1-N}$ provides an indication of a desire for contact information associated with given media content, the processing unit 44 of the computing device 40 generates and transmits one or more signals via the network interface 42 to the network processing entity 80. The one or more signals include 1) an indication of a desire for contact information associated with given media content, 2) a unique identifier associated with the network device or with one or more users of the network device and 3) an indication as to the given media content that was provided to the user of the network device. Upon receipt of the one or more signals, it is the network processing entity 80 that performs the process described with respect to FIG. 4.

More specifically, at step 70, the network processing entity 80 upon receipt of the one or more signals from the computing device 40, receives an indication that a user desires contact information associated with given media content. The network processing entity 80 then proceeds to step 72, wherein it obtains the contact information associated with the given media content. This can be obtained on the basis of the indication as to the given media content that was provided to the user of the network device that is received from the computing unit 40. The indication as to the given media content that was provided to the user of the network device may be a screenshot of the given media content that was being displayed to the user at the time the user provided the indication that contact information associated with the given media content was desired. In this way, on the basis of the screenshot, the network processing entity can perform a text recognition process or operation in order to obtain the contact information that is displayed on the screen shot.

In an alternative embodiment, the indication as to the given media content that was provided to a user of the network device may be a URL address indicative of the source of the media content. On the basis of this URL address, the network processing entity can obtain contact information associated with the media content that was displayed to the user. For example, the network processing entity 80 can contact a provider or source of the media content for obtaining the contact information associated with that media content.

Once the network processing entity 80 has obtained the contact information associated with the given media content, the network processing entity 80 is operative for causing the obtained contact information to be stored in a database associated with a given party. The database associated with the given party can be determined on the basis of the unique identifier that is provided to the network processing entity 80 by the computing device 40. This can be done in the same manner as described above with respect to step 74 of FIG. 4.

In this embodiment wherein it is the network processing entity 80 that performs the method described above with respect to FIG. 4, the computing device 40 includes logic, data and program instructions for causing the computing device 40 to issue the one or more signals to the network processing entity 80 that contain 1) an indication of a desire for contact information associated with given media content, 2) a unique identifier associated with the network device or with one or more users of the network device and 3) an indication as to the given media content that was provided to the user of the network device.

The contact information that is stored within a network contact database associated with a given party can be retrieved from that network contact database by one or more users associated with that given party. Network contact databases are known in the art, and as such will not be described in more detail herein.

While specific embodiments of the present invention have been described and illustrated, it will be apparent to those skilled in the art that further modifications and variations can be made without departing from the scope of the invention as defined in the appended claims.

The invention claimed is:

1. A method at a local device comprising:
   receiving a media content via a network;
   presenting said media content, comprising:
      during presenting of the media content, (i) providing to a user of the local device an option to submit an indication of a desire for storing contact information associated with an object displayed in the media content in a network contact database, (ii) determining whether to enable the option that has been presented to the user via the local device, and (iii) receiving an indication that the option has been selected;
   in response to the indication, obtaining the contact information associated with the object displayed within the media content in the case where it is determined that the option is enabled; and
   causing the obtained contact information to be stored in the network contact database associated with a given party via the network, wherein the media content includes a web page, and wherein the method further comprising:
identifying whether the web page includes text that may be the contact information.

2. A method as defined in claim 1, wherein the indication is received from a user input device.

3. A method as defined in claim 2, wherein the user input device includes a pointing device.

4. A method as defined in claim 2, wherein the user input device includes a remote control device.

5. A method as defined in claim 2, wherein the user input device includes a keypad on a communication device.

6. A method as defined in claim 1, wherein the media content is displayed to the given party via a network device.

7. A method as defined in claim 6, wherein the network contact database associated with the given party comprises a plurality of entries, each entry comprising contact information associated with a given contactable entity.

8. A method as defined in claim 1, wherein the providing to the user of the local device an option comprises providing to the user of the local device an option to submit an indication of a desire for storing contact information in the network contact database uniquely assigned to one or more devices including the local device.

9. A method as defined in claim 1, wherein the media content comprises more than one objects, each having different contact information.

10. A system comprising:
a) a hardware input for receiving an indication from a user;
b) a hardware processing unit operative for:
receiving a media content via a network;
presenting said media content, comprising:
during presenting of said media content, providing to the user an option to submit an indication of a desire for storing a contact information associated with an object displayed in the media content in a network contact database, determining whether to enable the option that has been presented to the user, and receiving an indication that the option has been selected from said hardware input;
in response to the indication, obtaining the contact information associated with the object displayed within the media content in the case where it is determined that the option is enabled; and
causing the obtained contact information to be stored in the network contact database associated with a given party via the network,
wherein the media content includes a web page, and wherein the hardware processing unit is further operative for:
identifying whether the web page includes text that may be the contact information.

11. A system as defined in claim 10, wherein the network contact database associated with the given party comprises a plurality of entries, each entry comprising contact information associated with a given contactable entity.

12. A system as defined in claim 10, wherein obtaining the contact information includes receiving from a source of the media content the contact information.

13. A system as defined in claim 10, wherein the processing unit is further operative for causing the media content to be displayed on a display screen of said network device.

14. A system as defined in claim 10, wherein the indication of a desire for the contact information associated with the media content is received via a user input device.

15. A system as defined m claim 14, wherein the user input device includes a pointing device.

16. A system as defined in claim 14, wherein the user input device includes a remote control device.

17. A system as defined in claim 14, wherein the user input device includes a keypad on the network device.

18. A system as defined in claim 10, wherein the providing to the user an option comprises providing to the user an option to submit an indication of a desire for storing contact information in the network contact database uniquely assigned to one or more devices.

19. A system as defined in claim 10, wherein the media content comprises more than one objects, each having different contact information.

20. A non-transitory computer readable storage medium storing one or more instructions, which when executed by a computer device, cause the computer device to perform a method comprising:
receiving a media content via a network;
presenting said media content, comprising:
during presenting of said media content, providing to the user an option to submit an indication of a desire for storing a contact information associated with an object displayed in the media content in a network contact database, determining whether to enable the option that has been presented to the user, receiving an indication that the option has been selected;
in response to the indication, obtaining the contact information associated with the object displayed within the media content in the case where it is determined that the option is enabled; and
causing the obtained contact information to be stored in the network contact database associated with a given party via the network,
wherein the media content includes a web page,
the one or more instructions comprise instructions, which when executed by the computer device, cause the computer device to further perform identifying whether the web page includes text that may be the contact information.

* * * * *